United States Patent [19]

Newton et al.

[11] Patent Number: 5,771,291
[45] Date of Patent: Jun. 23, 1998

[54] USER IDENTIFICATION AND AUTHENTICATION SYSTEM USING ULTRA LONG IDENTIFICATION KEYS AND ULTRA LARGE DATABASES OF IDENTIFICATION KEYS FOR SECURE REMOTE TERMINAL ACCESS TO A HOST COMPUTER

[76] Inventors: Farrell Newton, 8 Brighton 10th Path, Brooklyn, N.Y. 11235; Gareth Williams, 35-11 85th St., Jackson Hts., N.Y. 11372

[21] Appl. No.: 570,318

[22] Filed: Dec. 11, 1995

[51] Int. Cl.$^6$ .................................................. H04L 9/32
[52] U.S. Cl. ................... 380/25; 395/188.01; 364/286.5
[58] Field of Search ...................... 380/25; 395/188.01; 364/286.5

[56] References Cited

U.S. PATENT DOCUMENTS

| | | | |
|---|---|---|---|
| 4,430,728 | 2/1984 | Beitel et al. | 379/95 |
| 4,438,824 | 3/1984 | Mueller-Schuer | 380/23 |
| 4,528,643 | 7/1985 | Freeny | 364/468.23 |
| 4,733,345 | 3/1988 | Anderson | 380/25 |
| 4,916,738 | 4/1990 | Chandra et al. | 380/25 |
| 4,962,449 | 10/1990 | Schlesinger | 235/382 X |
| 4,993,068 | 2/1991 | Piosenka et al. | 380/23 |
| 5,261,070 | 11/1993 | Ohta | 395/188.01 |
| 5,272,754 | 12/1993 | Boerbert | 380/25 |
| 5,274,824 | 12/1993 | Howarth | 380/4 |
| 5,282,247 | 1/1994 | McLean et al. | 380/25 X |
| 5,337,358 | 8/1994 | Axelrod et al. | 380/23 |
| 5,363,446 | 11/1994 | Ruppertz et al. | 380/4 |
| 5,371,792 | 12/1994 | Asai et al. | 380/3 |
| 5,400,319 | 3/1995 | Fite et al. | 369/275.5 |

FOREIGN PATENT DOCUMENTS 2168831  6/1986  United Kingdom .

OTHER PUBLICATIONS

IBM Technical Disclosure Bulletin, "Cryptographic Key Distribution Method", vol. 29, No. 2, Jul. 1986, pp. 580–582.

Primary Examiner—Gilberto Barron, Jr.
Attorney, Agent, or Firm—Schweitzer Cornman Gross & Bondell LLP

[57] ABSTRACT

A method of providing user identification and authentication using ultra long identification key codes and/or ultra large databases of identification key codes in a manner providing secure access to a remote computer terminal to a database or server transaction program stored on a host computer.

4 Claims, 1 Drawing Sheet

USER IDENTIFICATION AND AUTHENTICATION SYSTEM USING ULTRA LONG IDENTIFICATION KEYS AND ULTRA LARGE DATABASES OF IDENTIFICATION KEYS FOR SECURE REMOTE TERMINAL ACCESS TO A HOST COMPUTER

BACKGROUND OF THE INVENTION

Most security programs for personal computers and networks rely upon simple user passwords and they are therefore vulnerable. There are two common methods for acquiring unauthorized access to a host computer. In the first method, the intruder improperly obtains and illegally uses the user ID and password of a valid user. The second method is to steal a valid user session in progress by switching the connection of the user to the thief's terminal. Without a method to verify the identity of the user, there is little preventing an intruder from obtaining unauthorized access to the user's account through a purloined user ID and password.

This lack of security has been a shortcoming of various corporate and other networks including the Internet and is one factor that has limited commercial use of these networks.

One existing authentication system proposes to add a card reader to personal computers so that users can verify their identity with a user identification card, as shown in U.S. Pat. No. 4,438,824, issued on Mar. 27, 1984, to C. Mueller-Schloer for an invention entitled "Apparatus and Method for Cryptographic Identity Verification". However, few users will spend the time and money to install an expensive card-reader. Furthermore, user identification cards have very limited storage and usually store a short identification key. Therefore, the same short identification key is used during most if not all authentications.

U.S. Pat. No. 5,371,792, entitled CD-ROM DISK AND SECURITY CHECK METHOD FOR THE SAME issued on Dec. 6, 1994 to Toshinori Asai and Masaki Kawahori, relates to CD-ROMs for television game devices. The purpose of the security check is to prevent unlicensed CD-ROM disks from being played on a Sega game machine. The CD-ROM disk identifier disclosed in this patent is not unique to each individual CD-ROM disk, but instead merely indicates a kind of the CD-ROM disk. All CD-ROM disks of the same type have the same disk identifier. In the patent, two kinds of identifiers, "SEGADISKSYSTEM" and "SEGABOOTDISC" are described. The security code indicates that the CD-ROM disk is duly licensed and also contains a program which generates a message displayed on the user's monitor that the disk is licensed.

There have been numerous patents issued for integrated circuit cards and other computerized portable security devices. For example, Beitel et al., U.S. Pat. No. 4,430,728, employs a physical security key which is coupled into a connector provided for it at a remote terminal. The key has two access keys which are required to access the central computer. This invention, like the Mueller-Schloer '824 credit card device, requires special hardware to be added to computers and requires costly security keys. Locking the terminal does not prevent intruders from procuring unauthorized access on public networks, since the intruder can use another terminal elsewhere.

SUMMARY OF THE INVENTION

The object of the present invention is to provide a practical and effective security system for secure remote terminal or terminal emulation or computer access to a host computer. This is accomplished by using ultra long passwords and/or ultra large databases of identification keys, i.e., by a CD-ROM disk or other portable large capacity storage medium containing a database of identification keys, long identification keys, or a combination thereof. The subsequent descriptions of the invention will be in terms of CD-ROM disks, although other portable storage media such as Zip disks, floppy disks, digital versatile disks (DVDs), and Bernoulli disks can be used as well. The authentication system further includes a remote terminal with a portable large capacity storage medium reader, and a communications device or system which connects the remote terminal to a host computer which has a large capacity storage medium.

In accordance with the invention, the new security system may utilize one or more CD-ROM disks, other portable storage media, other storage devices including redundant arrays of inexpensive disks and hard drives, or any hybrid thereof containing databases of the user identification keys.

The invention also contemplates encryption and other security methods for authenticating the identity of users.

DETAILED DESCRIPTION OF PREFERRED EMBODIMENTS OF THE INVENTION

Figure 1:
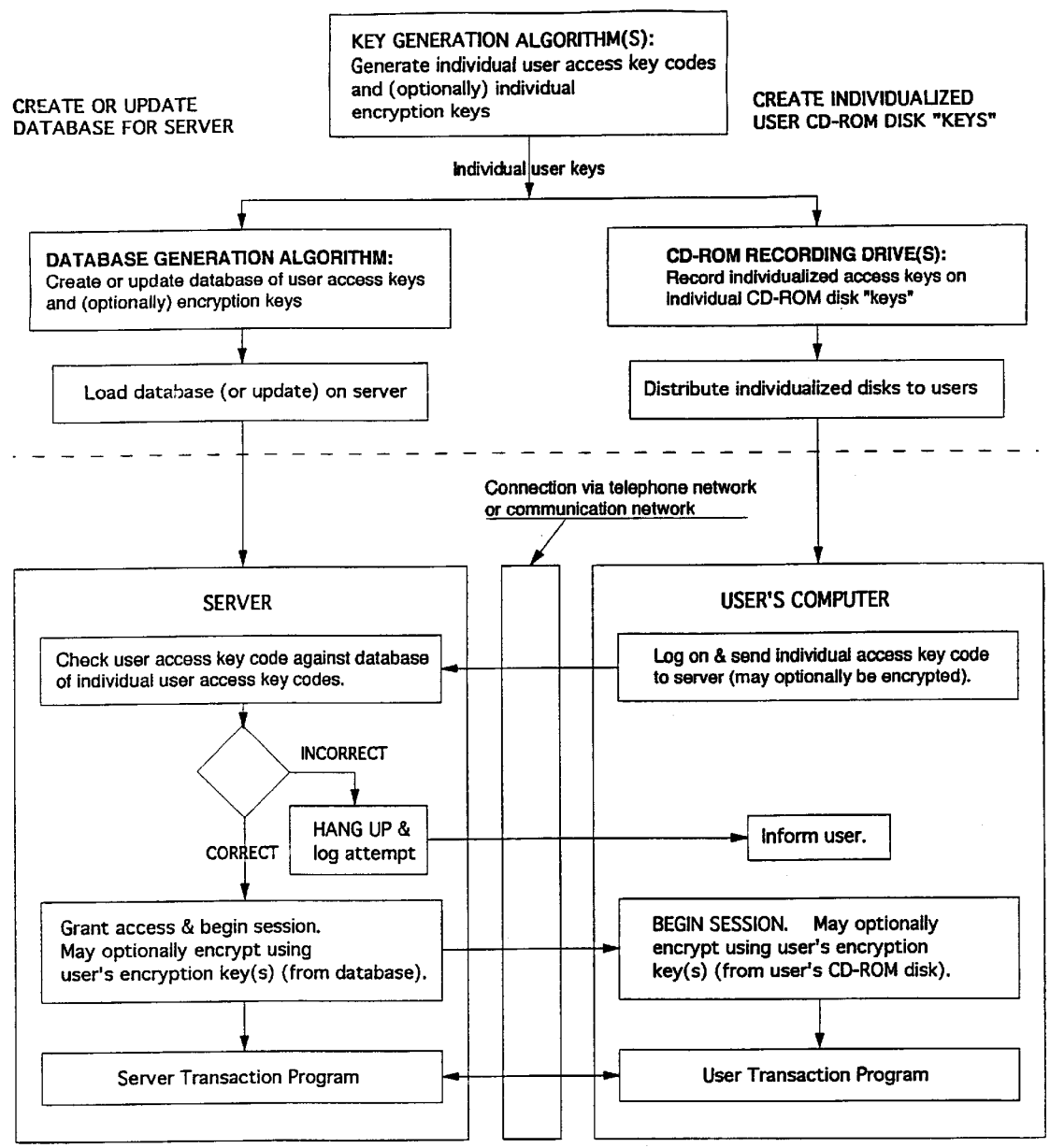
FIG. 1 is a schematic diagram of an exemplary embodiment illustrating the various steps required to practice the security system of the present invention, as well as illustrating the components which comprise the required hardware and software of one CD-ROM-based implementation of the system itself.

In general, the new and improved security system of the present invention provides individual users with what are characterized as "ultra long identification keys" which are embodied on a physical object such as a CD-ROM disk which is provided to the authorized individual user. By "ultra long" it is contemplated that the individual user code will comprise at least 25 characters or 25 bytes of information as a bare minimum (it being understood that the typical password employed for consumer credit cards and the like is 16 characters), although the use of a CD-ROM disk "key" enables passwords of hundreds of characters to be readily employed. The initial step in the new security method is to generate individual user access codes for each and every contemplated user who is to be granted authorized access to a network or a database or source or repository of information which is desired to be protected and which is stored in or in conjunction with a "home" server or base computer. The individual user access key codes are generated using algorithms which may be optionally provided with means to generate individual encryption keys as well, in accordance with well known methods and industry standards for generating encryption key codes. It is of course to be understood that in accordance with the principles of the present invention, the individual access key code is "ultra long" and is of a length that is otherwise too long and too cumbersome to be conveniently typed into a system by an individual and/or is too long to be included on a small credit card type of device, or the database of keys is too large to be included on a small card type of device.

A central registry or other compilation of all of the individualized user access codes is established and is optionally encrypted for loading on the home or main computer terminal or server on which the secured database is to be located or in association with which the server is to function as a security mechanism. As a parallel to this step of the development of the security system, each of the individualized user access key codes is separately recorded, for example by ganged optical recording machines of the type known to the art for recording information onto CD-ROM disks. Each disk is in the form of an actual physical "CD-ROM key" which is individualized for a particular end user (for example, a customer of a catalog sales organization, a user of a secure database, a customer of a financial institution, etc.).

At this stage of the establishment of the system there is a complete registry of "ultra long" identification key codes stored in a server and there is a distribution of the actual physical CD-ROM disk keys to authorized individual users who are to be provided access to a database.

In order to provide authorized access to an authorized user of the database or "transaction program", the user at his remote personal computer terminal which will be, of course, equipped with a CD-ROM reader, will load the CD-ROM disk into his computer and log onto an access program or user program (which may optionally be recorded on the CD-ROM disk as well). The user program then transmits the user's individual access key code (which optionally may be encrypted) over a communication network or over a telephone network to the host computer or server, which will be appropriately programmed to check the user's access key code against the registry of stored authorized individual user access key codes. The server program will further include the requisite steps to interdict and end any attempt to gain access to the server or transaction program through a transmitted access code which is not stored in the database of authorized individual user access key codes. The server program will disconnect and may optionally inform the user that an unauthorized key access code has been transmitted.

Alternatively, and assuming the CD-ROM disk was proper and contained an authorized access key code, the communication between the user's remote computer and the host server will continue with the host computer's program including steps to grant access to the user's program and begin the session. As will be explained hereinafter, the host computer program or server program and the user program may optionally encrypt the session using the user's encryption key or keys, which are also stored in the server's database and on the individual user's CD-ROM disk. The optional encryption might also include encryption keys which are stored on the user's CD-ROM disk key.

At this stage, access to the secured database or "secured server transaction program" can proceed with the authorized user communicating through his own personal computer with the host server to conduct whatever "transaction" he may wish to effect, ranging from the simple ordering of merchandise, to the conduct of financial transactions, to conduct of research into a secured database, or any other type of two-way communication which is capable of being conducted between a remote computer terminal and a host terminal over a communication network or a telephone network. It is to be understood that a level of security heretofore unavailable to remote consumers communicating with a host computer is provided by the new system which utilizes ultra long identification key codes typically impressed upon or otherwise recorded upon "large keys" in the form of a CD-ROM disk or the like. The ultra long identification keys are checked and approved through databases of such identification keys which are stored in a remote host computer or server.

Note that in some applications, the key generation algorithm might run on the server itself or even on the users' computers; in the latter case, means to avoid generating duplicate keys would be required (e.g. by a randomization function in the key generation algorithm, plus a check for duplicate keys whenever a new key is added to the database). The block diagram of FIG. 1 would then be modified accordingly.

Numerous other variants will also readily be apparent to those skilled in the art.

In a preferred embodiment, each user is issued a unique CD-ROM disk containing one or more unique identification keys. An individual user inserts his CD-ROM disk "key" into a computer connected via a network or other communications device to a host computer; also referred to herein as a server. An access program on the CD-ROM "key" connects to and forwards the unique identification key from the CD-ROM disk key to the host computer in encrypted form. A security authentication program stored on the server then decrypts the identification key, compares the identification key with an identification key from the database of user identification keys located on a large capacity storage device connected to the host computer, and verifies the user's identity. The host computer may include a program which will also demand that the user type in a password. If the identification key matches the identification key in the host computer's database of user identification keys and if the user enters the correct password, the host computer, through its programming, will grant access to the user.

The host computer (server) will be further programmed to require the remotely accessed terminal program to re-authenticate itself at regular intervals. This helps defend against thieves who capture an identification key en route to the host computer or who misappropriate or steal a user's connection. Unless a thief has the unique CD-ROM "key", he would be unable to use his unauthorized access for longer than the time between requested re-authentications.

Although individual identification keys are contemplated, in some applications, some or all of these identification keys may be shared among a class or subclass of users.

In another embodiment, the host computer is programmed to send an encryption key to the remote terminal. The terminal program executing on the remote terminal uses the encryption key to encrypt the unique identification key on the CD-ROM disk. Then the encrypted identification key is sent to the host computer for verification. If the encryption means is a public key encryption algorithm with a sufficiently long key, a third party would have great difficulty extracting the unencrypted identification. A variation to this method is to have part of the encryption key contained on the user's CD-ROM "key" with the other part sent from the host computer. The host computer always has access to a complete database of all the encryption keys and identification keys. Without the portion of the encryption key from the CD-ROM or host computer, the remote terminal program is unable to decrypt messages. If the encryption key from the host computer is varied with time, selected randomly, or unique to each user session, the user's computer will essentially never transmit the same encrypted identification key twice.

The remote terminal program can pad the identification key with random, null, or nonsense prefixes or suffixes or interpolated characters. To insure that the same identification message is not sent twice, the encryption algorithm is provided with good diffusion (wherein a change in any character in the plain text changes many or all of the characters in the encrypted text). The pad will preferably be specified by the host computer so that previously used encrypted identification keys do not repeat.

The pad can vary in a pre-determined manner with time. For example, the pad could be the day, hour, and minute clock. The host computer can then be programmed to check that the pad is correct based upon the day, hour, and minute. The pad can also vary with each logon.

Additionally, the user ID or user number may be padded as discussed above.

In another embodiment, the encryption key is included on the user's CD-ROM key disk and is never transmitted. The remote terminal program may pad the identification key as previously discussed. The host computer will be programmed to look up the encryption key for the user's claimed identity in a stored database of encryption and identification keys. Then the host computer will decrypt the unique identification key, remove the padding, and compare the decrypted key with the key retrieved from the host computer database, thereby verifying the user's identity. Again, when the encryption algorithm has good diffusion, the added characters will insure that the user's computer will essentially never transmit the same identification key twice.

In another embodiment, the central server selects the encryption key of the moment from a table on the user's CD-ROM; a copy of said table being in the central server. This avoids transmitting the encryption key over the connection; all that is transmitted is which entry in the key table is to be used, not the encryption key itself.

In another embodiment, the remote terminal transmits a plain text or encrypted user ID or identification key from the user's CD-ROM key identification key database to the host computer. A second encrypted identification key is sent from the remote terminal to the host computer. The first identification key is used by the host computer to look up a unique encryption key for that user. The second identification key is then decrypted using the unique encryption key and the user's claimed identity. If the decrypted identification key is correct, the user's claimed identity is then verified. The encryption key is never transmitted since both the remote terminal and the host computer have the encryption key stored locally.

In addition, other parts of the transmission, or the entire transmission or session may be encrypted using a unique user-specific encryption key on the user's CD-ROM disk. When the server is aware of the user's identity, it will look up said key in its own table; hence said key need never be transmitted between user and server or vice-versa. Again, techniques such as padding would typically be used. This embodiment not only provides additional security, it also securely authenticates the host computer to the remote terminal program. An "imposter" server would lack the database of user encryption keys and would be unable to decrypt the remote terminal's messages and accordingly would be unable to respond plausibly to the remote terminal.

Alternatively, a one-time pad stored on both the user's CD-ROM disk key and the host computer can be used as the encryption means or key to encrypt the user's identification key to provide additional security. After receiving the encrypted identification key, the host computer is programmed to look up the one-time pad under the user's claimed identity in a database of one-time pads. After decrypting the identification key, the host computer can authenticate the user's identity. Alternatively, a one-time pad of unique identification keys can be stored on each user's CD-ROM key disk. The central server would then demand a new key every time, and verify said new key against its own copy of that user's on-time pad of ID keys.

Both one-time pad arrangements also avoid transmitting the same user authentication key twice.

Furthermore, the one-time pad can be used to encrypt other important information communicated. For example, with use of a 250 kilobyte user-specific one-time pad (e.g. in conjunction with a consumer catalog) to encrypt the user's credit card number, assuming that one byte is used to encrypt each digit, then a sixteen digit credit card number would use 16 bytes of the 250 kilobyte one-time pad. Assuming the user performed ten transactions a day, the 250 kilobyte one-time pad would last more than four years.

For any of the aforementioned identification techniques, the terminal program and the host computer also may be programmed to demand that the user enter (e.g. by typing through a keyboard) a password previously specified. The password will be compared with the passwords stored on the CD-ROM or host computer corresponding to the user ID.

All of the above-described encryption methods can also be used to encrypt important information transmitted.

All of the above-described authentication methods can also be used in reverse to authenticate the host computer to the remote terminal program, as will be understood.

The most secure encryption techniques, such as public key encryption, can take up to 1000 times longer to process than more routine encryption methods, unless a special-purpose processor for the particular algorithm is added to the user s computer. One method to increase speed is to use the most secure means to encrypt only the most sensitive portions of the transmission and use faster encryption methods for less critical portions of the transmission. Because of the large capacity and speed of a CD-ROM, databases of encryption keys for each encryption method and host computer can be easily stored and accessed. Portions of the transmission that are common and do not need to be protected can be transmitted as plain text. Repeated text or graphics which all users will view can optionally be stored on the CD-ROM to decrease the amount of information transmitted from the host computer to the remote terminal.

A special encryption device may be attached to the host computer in order to expedite encryption and decryption of transmitted data. Since the host computer will most likely service many users, the encryption device should prove very economical.

The cost of having extremely large keys and databases of keys is the cost of the space on a CD-ROM which is not available for other information and the space needed to store these keys on the computer host. Since the cost of producing CD-ROM disks has dramatically decreased in the last few years, the use of CD-ROM disks has become quite economical. Thus the new authentication system of the invention is more economical and more effective than the prior art systems.

Additionally, each CD-ROM key of the invention may contain different identification keys or tables or databases of identification keys for use with different servers. For example, in an application wherein several catalogs of different vendors are contained on one CD-ROM key, different databases of identification keys and encryption keys would be allocated for use with each vendor's host computer.

To allow existing CD-ROM keys to be used to access new servers, each CD-ROM disk could include identification keys or tables or databases of identification keys that are initially not assigned to any server. These can then be assigned later to access new servers, computers, programs, databases or information functions. This arrangement averts the need for distributing new CD-ROM disks whenever a new server is added.

Information about the new server such as its name, network address, and telephone number, along with which database of keys on the CD-ROM disk is assigned to the new server needs to be given to the user's access program. For example, if 200 keys are already assigned to existing servers, the 201st key might be assigned to a new server. This information could be included in either encrypted or unencrypted form on an update floppy disk or other portable medium, posted on a bulletin board or server, including on any or all of the existing servers, or undated automatically by the remote terminal access program during a subsequent communication session. Such information may not be particularly private, as it is typically the same for all users being granted access to the new server.

The user's access program would typically store the update information for the new servers in a small file on the user's hard-drives. If the users have a writable CD-ROM drive, the information could be added to the CD-ROM disk key. If the information about each server comprise no more than 50 characters, a 10 kilobyte disk file could contain information on at least 100 new servers. A file a few megabytes in size would allow a short description of each server.

Eventually, the new servers would be included on undated CD-ROM disk keys distributed to all users.

Informational, transactional, and promotional databases are all of commercial interest. Access can be controlled, verified, or tabulated by the CD-ROM key. In addition, the individual CD-ROM disks may contain all or portions of these databases. The portions of the databases that change infrequently might be encoded on the users' CD-ROM disks and updated when new disks are produced, whereas variable portions might typically be stored on the server.

The host computer can be programmed to grant different access privileges to different users. For example, in a corporate network, the C.E.O.'s CD-ROM key would grant him access to all information on the host computer, while a clerk s disk might only grant access to a data entry program. Similarly, in a consumer application, different consumers might have different credit limits. The requisite privilege or privilege level might either be encoded on the CD-ROM or, preferably, would be included in a database on the host computer.

The CD-ROM key of the invention may contain both unencrypted and encrypted versions of one or more identification keys. The encryption is done before or as the disk is imprinted using a key and encryption method unknown to the user and using encryption means that are ideally unknown to the user. For user authentication purposes, the host computer, which has the key, would be programmed to demand both the unencrypted version of the identification key and the encrypted version of the key. The host computer then would be programmed to decrypt the encrypted version of the key and compare it with the unencrypted version. If the two keys are the same, then the user identification key is almost certainly a valid key. For example, if the encryption were the inverse of a long-key public-key encryption, the public key would be held by the host computer only (and the inverse or private key would be held by the disk maker only). An intruder would have to generate a counterfeit identification with the corresponding encrypted version, which would require the inverse or private key. Obtaining the key would be virtually impossible, even if the would-be counterfeiter obtained huge numbers of different user disks. And since even the server does not have the private key, cracking the server would not allow a counterfeiter to make new counterfeit user identification keys. Accordingly, the counterfeiting of valid user ID numbers can be eliminated.

A further security measure would be to append the encrypted version of the identification key to the unencrypted version to form a single longer key. Alternatively, the final key might comprise two different encrypted versions of the unencrypted key. Alternatively, the final key might be a function of both the unencrypted version and of a parity, hash, encryption function, or other function of the unencrypted version.

In addition, in certain applications, provisional initiation of the transaction upon receipt of a valid ID by the host computer might be permitted, but the transaction is completed only when the ID is verified in the server's database. This arrangement improves response time for the user and reduces the speed requirements on the storage means. For example, a credit card transaction could be started upon receipt of a valid ID but not completed until after the ID has been checked with the database and approved.

Unlike a human user, the computer does not make mistakes in entering an identification key. Accordingly, unless line disruption is indicated, the preferred software implementation will disconnect the user after only one attempt using any invalid CD-ROM identification key. This allows speedy rejection of attempts by hackers or other transgressors and avoids tying up the system with their illicit attempts. By disconnecting after one attempt, hackers cannot rapidly try multiple identification keys.

If this option is implemented, it is also preferable to not allow log-on if line disruption is indicated; else a hacker could counterfeit a parity failure or the like to allow multiple access key attempts. It may also be preferable to disconnect the user if more than, for example, three line disruptions are indicated during attempts to log-on.

The host computer's database of user identification keys is well protected against attempts to steal or copy it. Nevertheless, it is advantageous to protect against attempts to steal or copy the server's database of user identification keys or user access keys and thereby counterfeit the users' unique CD-ROMs. Accordingly, the server database of a preferred implementation of the invention contains an encrypted or otherwise altered version of the user identification keys. The server of the invention employs a trap-door authentication algorithm to compare the user ID or access key recovered from the incoming data stream with the altered version in the server's own database for that user's claimed identity. The trap-door authentication algorithm authenticates the user if and only if the encrypted identification key in the server's database represents the same identification key as the one embedded or encrypted in the incoming data stream. The trap-door authentication algorithm is impractical to be used to recover the actual identification key from the encrypted key in the host computer's database. Since the server database does not contain the actual identification keys, and the trap-door authentication function is of no help in recovering them, mere possession of the host computer's database is not sufficient to recover the identification keys. Thus, stealing or copying the host computer s database of identification keys will not allow a thief to counterfeit the users' unique CD-ROM key access disks and thus will not allow the thief to access the system as a legitimate user.

One such trapdoor authentication algorithm is implemented as follows. When preparing the users' CD-ROMs and the database for the host computer, the users' unique identification keys are encrypted with a difficult-to-decrypt long-key code. The encrypted key is copied into the host computer's database and the unencrypted identification key is written onto the user's CD-ROM key. In use, the host computer takes the identification key recovered from the incoming data stream from the user, encrypts it with the same means used to encrypt the database, and compares the encrypted key with the database entry for that user. If the keys are identical, the user is authenticated and access is granted.

Another class of trapdoor authentication algorithms go directly from the encrypted version of the password embedded in the data stream from the user to the other encrypted version in the server's database. Accordingly, the unencrypted version of the password never exists on the server and cannot be tapped or recorded by any illicit program or virus on the server.

In a yet further embodiment, each CD-ROM key is provided with multiple databases of identification and encryption keys. The server or host computer is programmed to use or have access only to one database. The copies of the other databases on the user's CD-ROM are stored in a vault. If the host computer's identification keys were ever stolen, the host computer can simply be loaded with one of the user databases from the vault and use the new identification keys. Since the user already has the new database of his new keys on his CD-ROM, there is no need to provide a new CD-ROM to all the users, and the thief remains locked out of the host computer. In addition, if only part of the server's database is copied or stolen, then only a portion of the database need be changed and only the corresponding users' CD-ROM disks need use an alternative identification database.

Preferably, a secure means to direct the users' computers to use a different database of identification keys on the CD-ROM is used. Any of the previously described authentication algorithms can be used for this purpose. One technique is for the server to encrypt by private key the message with a time-dependent pad. The user program on the CD-ROM then uses the public key, which is also stored on the CD-ROM, to decrypt the message, then checks that the time-dependent pad is correct and switches to an alternate user ID or identification key database. The private key and the replacement database are given to the host computer at the same time.

The host computer may be provided with multiple databases wherein a specific combination is required to access any identification keys. For example, in one embodiment, one database contains a one-time pad and the other contains the database of identification keys encrypted using the one-time pad. A thief who stole or copied only the database would be unable to recover any keys.

In corporate applications, where the user CD-ROM keys will be used only or primarily on the company's own computers, the change to another user ID can be made permanent by recording a word in a small file on the hard drive. Once the file is altered on all of the company's computers, the change is complete. This could be done at the next log-on for each user.

In yet a further implementation, the host computer can use an array of inexpensive CD-ROM drives to store the database of identification keys. Advantages of this novel CD-ROM array approach include that the cost per megabyte is comparable to or less than that of magnetic disk drives, and that a drive failure almost always leaves the recorded data intact. The CD-ROM disk can simply be changed to another drive. In addition, there is the security advantage that the written data is in permanent form.

As an occasional delay in a transaction is tolerable, magnetic tape can optionally be used as a back-up means or as a redundant storage means for use in regenerating data.

The users' CD-ROM disks may also contain a network access program, encryption routines, and other data and programs of utility to the users.

The portable large storage media can contain a read-only portion and a read-write portion, typically a write-once read-many portion. (See for example the disks illustrated and described in U.S. Pat. Nos. 5,287,335 and 5,206,063, the substance of which patents is incorporated by reference herein.) The read-only portion would typically contain programs or information common to many users, e.g. network access programs and/or encryption routines and/or other data or programs of utility to many users. For example, in consumer applications, the read-only portion might include catalogs, advertising, or other commercial information. The read-write portion or write-once read-many portion would typically contain the unique user access key codes and unique user encryption keys (if used) and any other information unique to the particular user.

In a CD-ROM implementation, the read-only portion of the users' disks could be imprinted quickly and economically by pressing. The individualized portion, typically a write-once, read-many portion, would then be quickly recorded on an appropriate recording CD-ROM drive. This approach may prove advantageous in a variety of high-volume applications.

The means discussed herein for securing and controlling access to a host computer or server can also be implemented on an auxiliary or dedicated processor or computer such as a "firewall processor", or on a network processor, router, or switching system, instead of the host computer or server. An auxiliary or dedicated processor or computer eliminates the need for the host computer to perform the authentication, decreasing the processing load of the host computer.

The CD-ROM or the other portable storage medium can be used to control access to, through, or under the control of, any stored-program processor capable of directly or indirectly accessing storage capacity sufficient to hold the requisite database of user key codes. Indirect access may comprise remote access via a network or may comprise access from another processor or memory system.

It will also readily be apparent to those skilled in the art that the means described herein for providing secure access to a host computer or server or to databases or transaction processing systems implemented on same can also be used to control access to other computers, or to networks, or to databases or transaction processing systems or other programs or information functions implemented on or accessed through same.

We claim:

1. A method of providing user identification and authentication using ultra long identification key codes and/or ultra large databases of identification key codes in a manner providing secure access from a remote computer terminal to a database or server transaction program stored on a host computer, comprising the steps of:

(a) utilizing key generation algorithms to generate individual, class specific, or both user key codes which may optionally contain individual encryption keys;

(b) creating a database or otherwise updating an existing database comprising a compilation of each of the access key codes which have been generated for predetermined authorized users of the server transaction program;

(c) recording, on separate individual portable storage media directly compatible with and readily insertable and removable from said remote computer terminal, each of said individualized and class specified user access key codes along with the optional individual encryption keys;

(d) loading or providing the server serving as the host computer with a complete registry or compilation of each individualized and class specified access key code and any optional individual encryption keys which have been generated by the key generation algorithms;

(e) providing each authorized user with said portable storage medium containing the authorized user's individual or class specified access key code;

(f) providing the server with computer programming including steps for comparing individual and class specified access key codes transmitted over telephone networks or communication networks from a user's remote computer terminal against the stored compilation of authorized access key codes and permitting correct matches to have access to said server transaction program while denying access to unauthorized access key codes;

(g) providing users' remote computer terminals with programming to permit connection to said server through a communication network or telephone network and to transmit individual and class specific access key codes through said remote computer terminal utilizing readers for the portable storage medium to said server for the purposes of gaining access to said server transaction database; and (h) conducting a communications session between the user's remote computer terminal and said server transaction program through said telephone or communication network.

2. A user identification authentication system using ultra long identification keys and/or ultra large databases of identification keys for secure remote computer terminal access to a host computer comprising:

(a) a host computer having a compiled database of pre-authorized user access key codes of ultra long length;

(b) a series of individual portable storage media directly compatible with and readily insertable and removable from said remote computer terminal, each containing a unique or class unique access key code distributed among authorized users of a server transaction program;

(c) a server with programming to compare received access key codes with stored authorized access key codes and to deny access to the server transaction program to any user transmitting an unauthorized key code but to permit access to any user transmitting an authorized access key code;

(d) each of said access key codes being ultra long and comprising at least 25 characters or 25 bytes.

3. A method of providing user identification and authentication as described in claim 1, further comprising:

(a) an algorithm which generates one time pads;

(b) said one time pads are stored on a CD-ROM which is said portable storage medium and said pads are loaded or provided to the server; and (c) the one time pads are used to encrypt the user access key codes by the remote computer terminal access program before being transmitted to the host computer.

4. The method of claim 3, further including the step of:

(a) providing additional programming on said CD-ROM.

* * * * *